(12) United States Patent
Kaufman et al.

(10) Patent No.: US 8,171,147 B1
(45) Date of Patent: May 1, 2012

(54) SYSTEM, METHOD, AND/OR APPARATUS FOR ESTABLISHING PEER-TO-PEER COMMUNICATION

(75) Inventors: Matthew Kaufman, Bonny Doon, CA (US); Adam Lane, San Jose, CA (US); Michael C. Thornburgh, Santa Cruz, CA (US); Slavik Lozben, San Carlos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 581 days.

(21) Appl. No.: 12/034,649

(22) Filed: Feb. 20, 2008

(51) Int. Cl.
*G06F 15/16* (2006.01)
(52) U.S. Cl. .................. 709/228; 709/227; 709/250
(58) Field of Classification Search ................. 709/227, 709/228
See application file for complete search history.

(56) References Cited

U.S. PATENT DOCUMENTS

| | | | |
|---|---|---|---|
| 4,475,192 A | 10/1984 | Fernow et al. | |
| 5,774,660 A | 6/1998 | Brendel et al. | |
| 5,857,072 A | 1/1999 | Crowle | |
| 6,032,175 A | 2/2000 | Fletcher et al. | |
| 6,138,120 A | 10/2000 | Gongwer et al. | |
| 6,330,671 B1 | 12/2001 | Aziz | |
| 6,338,089 B1 | 1/2002 | Quinlan | |
| 6,563,793 B1 | 5/2003 | Golden et al. | |
| 7,039,916 B2 | 5/2006 | Jason, Jr. | |
| 7,111,162 B1 | 9/2006 | Bagepalli et al. | |
| 7,246,356 B1 | 7/2007 | Lozben et al. | |
| 7,274,706 B1 | 9/2007 | Nguyen et al. | |
| 7,305,486 B2 | 12/2007 | Ghose et al. | |
| 7,403,945 B2 | 7/2008 | Lin et al. | |
| 7,448,080 B2 | 11/2008 | Karjala et al. | |
| 7,600,113 B2 | 10/2009 | Kuehnel et al. | |
| 7,603,454 B2 | 10/2009 | Piper et al. | |
| 2002/0010783 A1 | 1/2002 | Primak et al. | |
| 2002/0029256 A1 | 3/2002 | Zintel et al. | |
| 2002/0062375 A1 | 5/2002 | Teodosiu et al. | |
| 2002/0065912 A1 | 5/2002 | Catchpole et al. | |
| 2002/0107935 A1 | 8/2002 | Lowery et al. | |
| 2002/0112058 A1 | 8/2002 | Weisman et al. | |
| 2002/0184310 A1 | 12/2002 | Traversat et al. | |
| 2003/0135625 A1 | 7/2003 | Fontes et al. | |
| 2003/0163702 A1 | 8/2003 | Vigue et al. | |
| 2003/0191828 A1 | 10/2003 | Ramanthan et al. | |
| 2003/0233540 A1 | 12/2003 | Banerjee et al. | |
| 2004/0034776 A1* | 2/2004 | Fernando et al. | 713/171 |
| 2004/0064568 A1 | 4/2004 | Arora et al. | |
| 2004/0098502 A1 | 5/2004 | Xu et al. | |
| 2004/0193461 A1 | 9/2004 | Keohane et al. | |
| 2004/0268142 A1 | 12/2004 | Karjala et al. | |
| 2005/0096753 A1* | 5/2005 | Arling et al. | 700/11 |
| 2005/0097222 A1 | 5/2005 | Jiang et al. | |
| 2005/0188193 A1 | 8/2005 | Kuehnel et al. | |
| 2005/0198634 A1 | 9/2005 | Nielsen et al. | |
| 2006/0036756 A1* | 2/2006 | Driemeyer et al. | 709/231 |
| 2006/0041745 A1 | 2/2006 | Parnes | |

(Continued)

OTHER PUBLICATIONS http://en.wikipedia.org/wiki/Gnutella, Apr. 25, 2008, 8 pages.

(Continued)

*Primary Examiner* — Quang N. Nguyen
*Assistant Examiner* — Andrew Woo
(74) *Attorney, Agent, or Firm* — Fish & Richardson P.C.

(57) ABSTRACT

Embodiments of methods, apparatuses, devices and systems associated with peer-to-peer communications are disclosed.

22 Claims, 5 Drawing Sheets

U.S. PATENT DOCUMENTS

| | | | |
|---|---|---|---|
| 2006/0047831 | A1 | 3/2006 | Piper |
| 2006/0053209 | A1 | 3/2006 | Li |
| 2006/0101081 | A1 | 5/2006 | Lin et al. |
| 2006/0168320 | A1 | 7/2006 | Kidd et al. |
| 2006/0215652 | A1 | 9/2006 | Strandridge et al. |
| 2006/0248195 | A1 | 11/2006 | Toumura et al. |
| 2006/0256711 | A1 | 11/2006 | Kusama et al. |
| 2007/0086357 | A1 | 4/2007 | Okmianski et al. |
| 2007/0179835 | A1* | 8/2007 | Ott et al. .......... 705/10 |
| 2007/0234428 | A1 | 10/2007 | Rash |
| 2007/0250590 | A1 | 10/2007 | Flannery et al. |
| 2008/0040226 | A1 | 2/2008 | Roker |
| 2008/0049607 | A1 | 2/2008 | Xu |
| 2008/0075048 | A1 | 3/2008 | Suszko |
| 2008/0141274 | A1* | 6/2008 | Bhogal et al. .......... 719/313 |
| 2008/0205394 | A1 | 8/2008 | Deshpande et al. |
| 2008/0280623 | A1 | 11/2008 | Danne et al. |
| 2008/0301219 | A1* | 12/2008 | Thornburgh et al. .......... 709/203 |
| 2009/0024739 | A1 | 1/2009 | Thornburgh et al. |
| 2009/0150534 | A1 | 6/2009 | Miller et al. |
| 2009/0164774 | A1 | 6/2009 | Sherkin |
| 2009/0249074 | A1 | 10/2009 | Madhavan et al. |
| 2009/0287826 | A1 | 11/2009 | Kaufman et al. |
| 2010/0015960 | A1 | 1/2010 | Reber |

OTHER PUBLICATIONS http://en.wikipedia.org/wiki/BitTorrent_%protocol%29, May 5, 2008, 13 pages.

http://en.wikipedia.org/wiki/Kazaa, May 3, 2008, 7 pages.

Kaufman, Matthew, et al., "The Secure Media Flow Protocol—Version 1" Amicima, Inc., 2004, pp. 1-14.

"Secure Hash Standard" Federal Information Processing Standards Publication 180-2, Aug. 1, 2002, pp. i-iii and 1-71.

Menezes et al., "Handbook of Applied Cryptography", CRC Press, 1996, pp. 321-383, 64 pages.

International Search Report and Written Opinion mailed Jun. 27, 2008 in related matter PCT/US2008/053865, 9 pages.

International Search Report and Written Opinion mailed Oct. 28, 2008 in related matter PCT/US08/063739, 14 pages.

Patent Application filed Jan. 3, 2008 for related U.S. Appl. No. 11/969,186, 22 pages.

U.S. Appl. No. 11/779,165, filed Jul. 17, 2007, Thornburgh et al.

Office action mailed Jul. 2, 2009 in co-pending U.S. Appl. No. 11/757,126, 15 pages.

Response filed Sep. 28, 2009 in co-pending U.S. Appl. No. 11/757,126, 23 pages.

Office action mailed Sep. 3, 2009 in related matter U.S. Appl. No. 11/779,165, 21 pages.

Cooper, D., et al., "Internet X.509 Public Key Infrastructure Certificate and Certificate Revocation List (CRL) Profile," Standards Track, Network Working Group, May 2008, 151 pages.

Co-pending U.S. Appl. No. 11/757,126, filed Jun. 1, 2007.

Federal Information Processing Standards "Secure Hash Standard" Publication 180-2, Aug. 1, 2002, downloaded from the Internet at http://csrc.nist.gov/publications/fips/fips180-2/fips180-2.pdf on May 9, 2008, 74 pages.

Housley, "Internet X.509 Public Key Infrastructure Certificate and Certificate Revocation List (CRL) Profile", Apr. 2002, downloaded from the internet at http://www.ietf.org/rfc/rfc3280.tx?number=3280 on Dec. 5, 2007, 127 pages.

International Standards Organization "ISO/IEC 9796-2 Information Technology, Security Techniques, Digital Signature Schemes, Giving Message Recovery" International Organization for Standards ISO/IEC 9796-2:2002/Amd.1:2008, Oct. 1, 2002 and Amendment of Jan. 15, 2008, 61 pages.

Kaufman, Matthew et al., "Multicast Systems, Methods, and Computer Program Products," U.S. Appl. No. 12/211,700, filed Sep. 16, 2008, 32 pages.

Kaufman, Matthew et al., "Self Organizing Peer-To-Peer System, Method, And/Or Apparatus," U.S. Appl. No. 11/969,186, filed Jan. 3, 2008, 25 pages.

Narten et al,, "Neighbor Discovery for IP Version 6 (IPv6)," RFC 2461, Dec. 1998, 83 pages.

Plummer, David C., "An Ethernet Address Resolution Protocol—or—Converting Network Protocol Addresses to 48. bit Ethernet Address for Transmission on Ethernet Hardware," RFC 826, Nov. 1982, 8 pages.

Rescorla, "Diffie-Hellman Key Agreement Method", Network Working Group, Request for Comments: 2631, Jun. 1999, downloaded from the internet at http://www.ietf.org/rfc/rfc263.txt on May 13, 2008, 13 pages.

RSA Security, Inc. "PKCS #1 v.2.1: RSA Cryptography Standard", downloaded from the internet at http://www.rsa.com/rsalabs/node.asp?id=2125 on May 13, 2008, 61 pages.

Thornburgh, et al. "Endpoint Discriminator in Network Transportation Protocol Startup Packets", U.S. Appl. No. 11/779,165, filed Jul. 17, 2007, 32 pages.

Examiner's Interview Summary mailed Oct. 9, 2009 in U.S. Appl. No. 11/757,126, 3 pages.

Final Office action mailed Oct. 26, 2009 in U.S. Appl. No. 11/757,126, 10 pages.

Request for Continued Examination and Amendment After Final filed Nov. 13, 2009 in U.S. Appl. No. 11/757,126, 20 pages.

Amendment filed Oct. 28, 2009 in U.S. Appl. No. 11/779,165, 30 pages.

Office action: Restriction Requirement mailed Nov. 3, 2009 for U.S. Appl. No. 11/969,186, 7 pages.

Gupta. A client Oriented, IP level redirection Mechanism. IEEE. 1999. pp. 1461-1469.

International Search Report and Written Opinion, mailed Jun. 29, 2009 in matter PCT/US09/43824, 7 pages.

International Preliminary Report on Patentability, mailed Jan. 28, 2010 in matter PCT/US08/063739, 7 pages.

Office Action mailed Jan. 4, 2010, in co-pending U.S. Appl. No. 11/757,126. 20 pages.

Office Action mailed Feb. 15, 2011 in co-pending U.S. Appl. No. 12/485,821. 20 pages.

Office Action mailed Jan. Aug. 17, 2011, in co-pending U.S. Appl. No. 12/485,821. 25 pages.

Office Action mailed Sep. 1, 2010, in co-pending U.S. Appl. No. 11/779,165. 17 pages.

Office Action mailed Sep. 3, 2009, in co-pending U.S. Appl. No. 11/779, 165. 16 pages.

Office Action mailed Jan. 13, 2010, in co-pending U.S. Appl. No. 11/779,165. 19 pages.

Office Action mailed Mar. 31, 2010, in co-pending U.S. Appl. No. 11/779,165. 15 pages.

Office Action mailed Apr. 29, 2011, in co-pending U.S. Appl. No. 11/779,165. 11 pages.

Office Action mailed Sep. 29, 2011, in co-pending U.S. Appl. No. 11/779,165. 13 pages.

Office Action mailed May 26, 2010, in co-pending U.S. Appl. No. 11/969,186. 8 pages.

Office Action mailed Nov. 18, 2010, in co-pending U.S. Appl. No. 11/969,186. 9 pages.

Office Action mailed Dec. 16, 2009, in co-pending U.S Appl. No. 11/969,186. 8 pages.

Office Action mailed Nov. 10, 2011, in co-pending U.S. Appl. No. 12/120,229. 29 pages.

Office Action mailed Jun. 9, 2011, in co-pending U.S. Appl. No. 12/120,231. 9 pages.

Office Action mailed Jul. 21, 2010, in co-pending U.S. Appl. No. 12/120,231. 9 pages.

Office Action mailed Oct. 15, 2010, in co-pending U.S. Appl. No. 12/120,231. 11 pages.

* cited by examiner

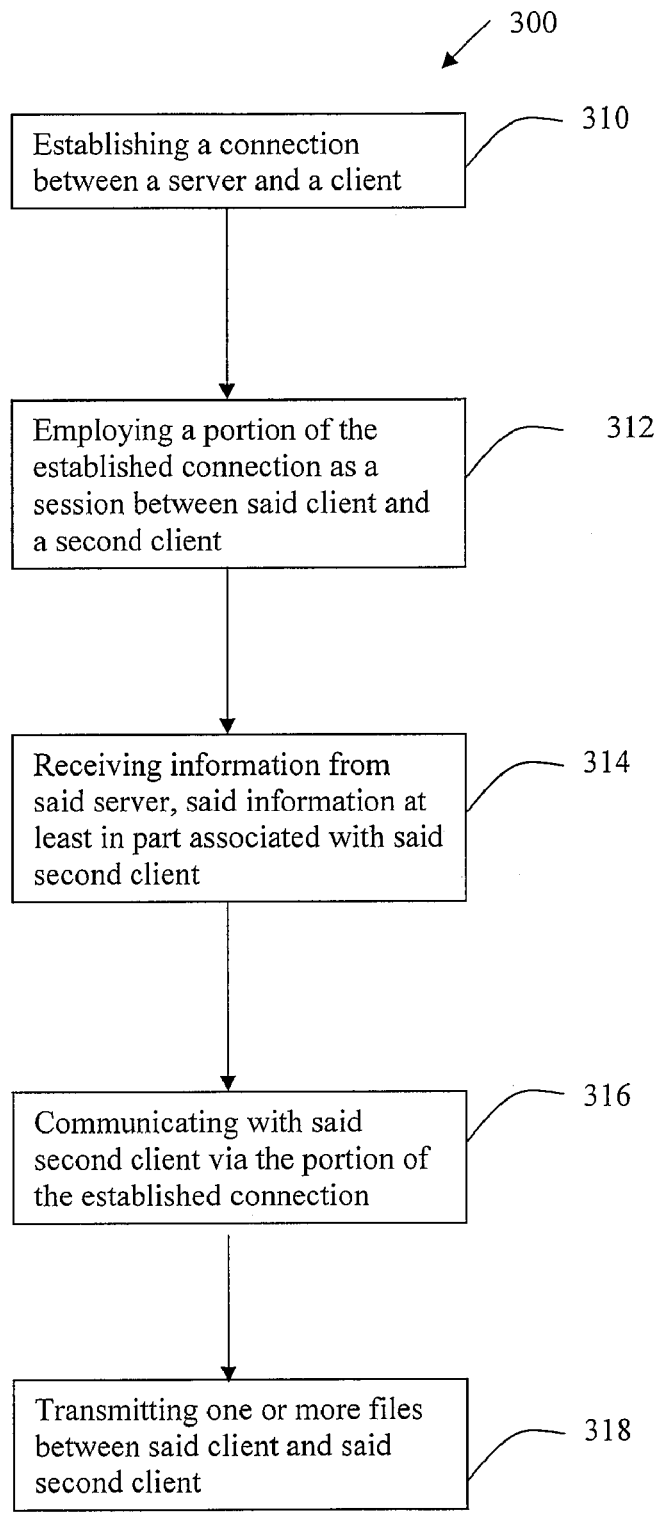

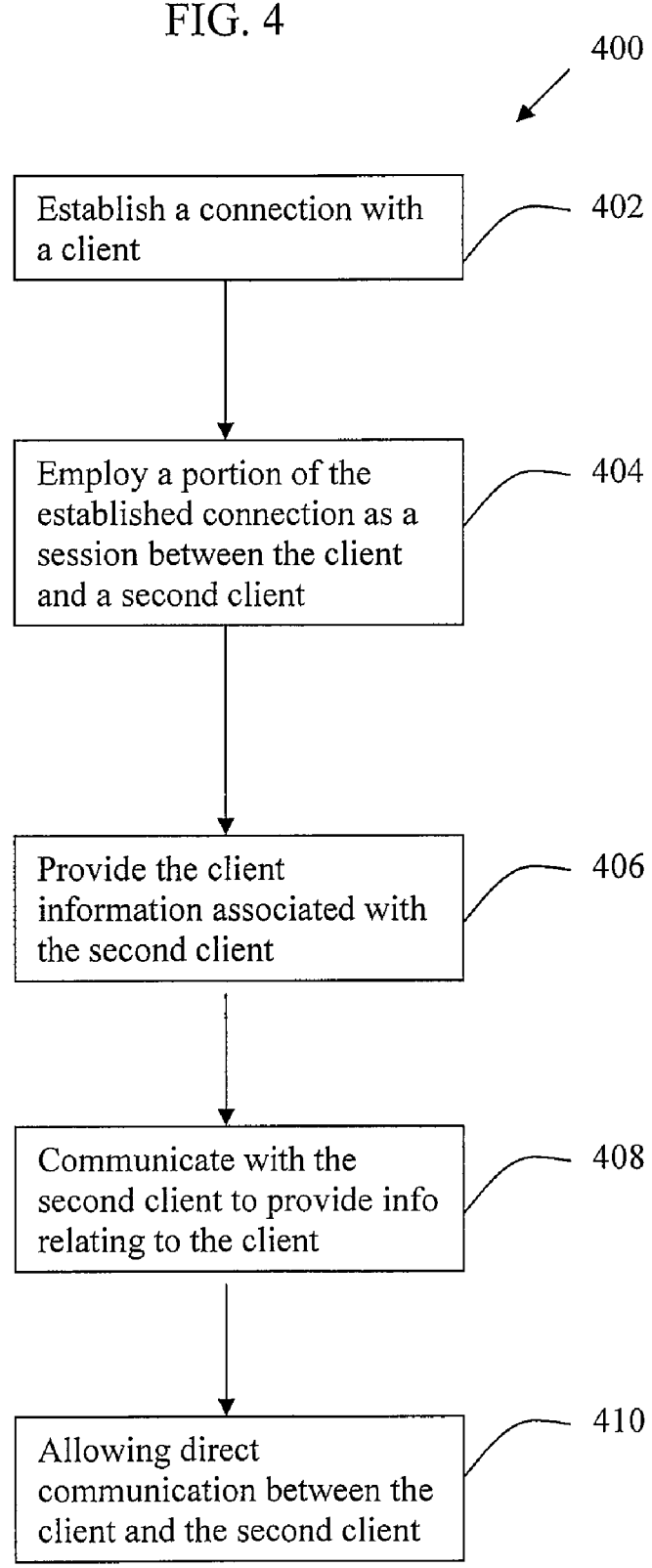

SYSTEM, METHOD, AND/OR APPARATUS FOR ESTABLISHING PEER-TO-PEER COMMUNICATION

FIELD

Embodiments of the invention relate to the field of peer to peer communication, and more specifically to establishing communication between peers.

BACKGROUND

To form a session to a server capable of providing a service and/or resource, a client may first establish a session with a server. Some communications protocols, such as Transmission Control Protocol (TCP), have no identifying information at the transport level beyond the socket address. Other protocols, such as Secure Media Flow Protocol (MFP), contain cryptographic credentials, which allow the client to determine if a responder has the desired identity and continue with session startup and communication. In addition, a computing device, such as a client may, under some circumstances, want to communicate with one or more other computing devices on a peer-to-peer basis, in addition to communicating with the server over the established session. To communicate on a peer-to-peer basis, a client may establish and manage a separate session with a peer device. As such, an application hosted on such a client typically manages communication with a server and peer device through multiple logical connections according to an application programming interface (API). Accordingly, solutions for establishing and managing computing device peer-to-peer communications in addition to client/server communications may be advantageous.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIG. 3 is a flow diagram of a process associated with actions of a computing device initiating a session with a server in accordance with an embodiment; and FIG. 4 is a flow diagram of a process associated with converting a portion of an established session into a session between and/or among two or more peer devices.

DETAILED DESCRIPTION

Figure 1A:
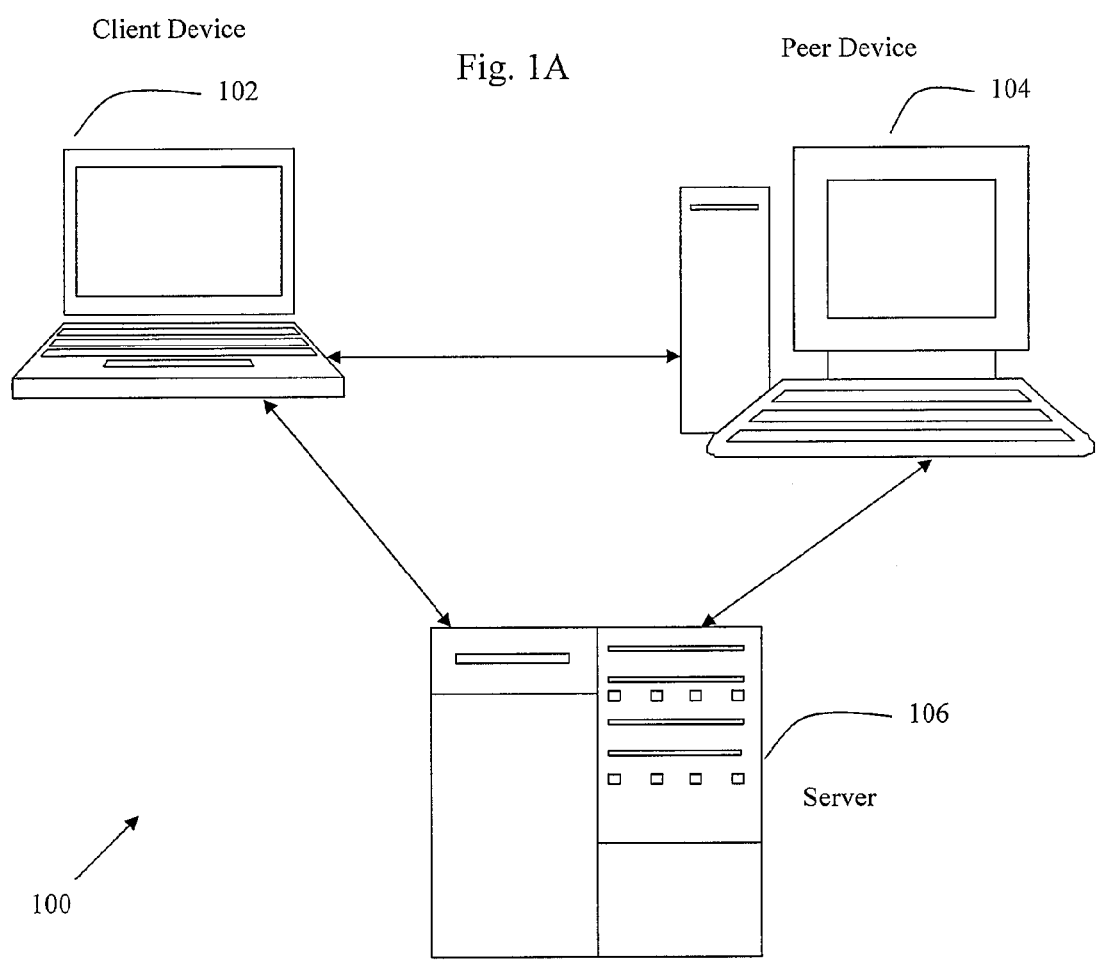
FIG. 1A is schematic diagram of a network topology for transmitting information between clients and/or among devices in accordance with an embodiment.

In the following detailed description, numerous specific details are set forth to provide a thorough understanding of the claimed subject matter. However, it will be understood by those skilled in the art that the claimed subject matter may be practiced without these specific details. In other instances, methods, procedures, and/or components that would be known by one of ordinary skill have not been described in detail so as not to obscure the claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "obtaining," "hosting," "maintaining," "representing," "modifying," "receiving," "transmitting," "establishing," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, processes described herein, with reference to flow diagrams or otherwise, may also be executed and/or controlled, in whole or in part, by such a computing platform.

In one embodiment, a computing platform may comprise one or more "communication adapters" to enable communication between processes executing on the computing platform and a network. Such a communication adapter may comprise a device capable of transmitting information to and/or receiving information from a communication channel and/or data link. In one particular embodiment, for example, a communication adapter may be capable of transmitting information to and/or receiving information from a data transmission medium according to a predefined communication protocol.

A "client" as referred to herein relates to a process that is capable of communicating with other processes through a network to perform one or more functions or tasks. For example, a client may comprise one or more application programs hosted on a computing platform capable of transmitting information to and/or receiving information from a network through a communication adapter.

A "server" as referred to herein relates to a process that is capable of providing a service and/or resource to other processes, such as clients, in communication with the server over a network. In one particular example, a server may comprise one or more application programs hosted on a computing platform capable of transmitting information to and/or receiving information from a network through a communication adapter.

A "peer device" as used herein relates to a process that is capable of communicating with other processes through a network to perform one or more functions or tasks. A peer device may perform functions similar to a server at times, while also performing functions similar to a client at times. For example, a peer device may comprise one or more application programs hosted on a computing platform capable of transmitting information to and/or receiving information from a network through a communication adapter.

A "session" as referred to herein relates to a period during which processes communicate over a network to perform one or more tasks, operations and/or functions. In one particular embodiment, a session may be established between a client and a server for the purpose of providing one or more resources and/or services to the client. For example, such a session between a client and server may be established for any one of several communication protocols (e.g., TCP/IP) for the transmission of datagrams and/or packets. In a particular embodiment, such a session may be established according to a particular communication protocol enabled by a network employing network, data link and physical layer protocols for transmission of information between processes according to associated addresses.

A "connection" as referred to herein relates to a logical representation of one or more sessions. For example, such a connection may provide a logical representation of sessions to multiple devices. As illustrated below in particular examples, such a connection may be enabled by an application programming interface (API) allowing an application program hosted on one device to communicate with two or more other devices through a single connection.

FIG. 1A is a schematic diagram of a system 100 that is capable of establishing a session between a client device 102, a peer device 104, and/or one or more servers 106 over a network (not shown). The network may employ data links (not shown) comprising one or more data transmission mediums such as, for example, cabling (e.g., fiber optic, twisted wire pair, coaxial), satellite transmission links, and/or terrestrial wireless transmission links. Additionally, the network may employ one or more communication protocols for transmitting information between a source and a destination such as, for example, an Internet Protocol (IP), asynchronous transfer mode (ATM), Synchronous Optical Network, Session Initiation Protocol (SIP), and/or communication protocols adapted for use on wireless transmission links. In particular embodiments, the network may comprise one or more network topologies and/or configurations such as, for example, one or more local area networks, one or more Intranets, the Internet, and/or wireless carrier infrastructure, just to name a few examples. While particular examples provided herein establish a connection for establishing a session between a client and server, and employing a portion of an established connection for a session for peer to peer communication.

According to an embodiment, client device 102 and/or peer device 104 may comprise one or more processes hosted on one or more computing platforms that may be communicatively coupled to the network by a communication adapter (not shown). Such processes may comprise, for example, one or more application programs which are enabled and/or supported by procedures and/or functions of an API. Here, such procedures and/or functions of an API may enable such an application program to communicate through a communication adapter with processes hosted on other devices.

Similarly, server 106 may comprise processes hosted on one or more computing platforms connected to the network by an associated communication adapter. In particular embodiments, each server 106 may be hosted on its own associated computing platform which is distinct from computing platforms hosting other servers 106. Alternatively, two or more servers may be hosted on a single computing platform.

According to an embodiment, client device 102 and/or peer device 104 may establish a connection which may initiate a session with server 106 to provide a service by, for example, establishing a second session through which client device 102 and/or peer device 104 may communicate with server 106 over the network. Client device 102 and/or peer device 104 may comprise any one of several application programs hosted on a computing platform such as, for example, email applications, web browsers, document processing programs, media players, one or more peer-to-peer publishing standards, and/or the like.

In one particular example, in a peer-to-peer session one peer device may function as a publisher, or publishing device while a second peer device may function as a renderer, or rendering device. Here, it should be understood that client device 102 and/or peer device 104 may be hosted and/or executed on any one of several devices capable of communicating with a network such as, for example, personal computers, mobile telephones, personal digital assistants, just to name a few examples. In particular embodiments, although claimed subject matter is not limited in this respect, a server may comprise a print server adapted to process print jobs, web server, email server, content server adapted to distribute audio or video content (e.g., through streaming). In a particular embodiment, server 106 may be addressable through a single socket address. A socket address may comprise, for example, information combining an IP address and a UDP port number.

Figure 1B:
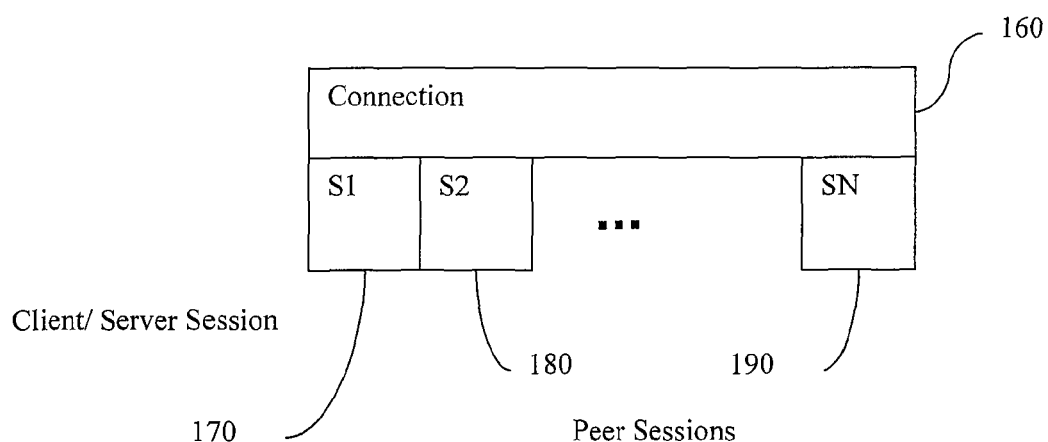
FIG. 1B depicts an example embodiment of an application programming interface according to an embodiment.

FIG. 1B depicts an Application Program Interface (API) 150 in accordance with an embodiment. With regard to FIG. 1B, API 150 may be used, such as by an application program (not shown) to establish a connection 160. Connection 160 may in turn be used to establish one or more sessions, such as sessions 170, 180, and/or 190. In an embodiment, connection 160 may establish session 170 as a client/server session with one or more servers, for example. Under certain circumstances it may be desirable to also establish a peer to peer session as well. Accordingly, connection 160 may establish sessions 180 and/or 190 as peer-to-peer sessions. However, the particular application program interacting with API 150 does not need to manage or establish those separate sessions. To the particular application program interacting with API 150 it appears that there is only one connection and that one or more portions, such as one or more data streams, of that connection have been utilized for peer-to-peer communications. Accordingly, an application program developer may develop application programs capable of communicating with multiple devices through a single connection 160, without needing to have that application program manage multiple independent session with those multiple devices.

In accordance with an embodiment, one possible API implementation of establishing client server communication and peer to peer communication without a particular application program directly creating a separate session for each is as follows:

1) netconnectionToServer=new NetConnection( ); <to create a new net connection>
2) netconnectionToServer.Connect(addressOfServer); <to use the created net connection to establish a connection with a server>
3) videoFromServerStream=new NetStream(netconnectionToServer); <to initiate a session with server, such as for audio of video streaming>
4) videoFromPeerStream=new NetStream(netconnectionToServer, nameOfPeer); <to initiate a separate session with a peer device, such as for audio or video streaming>

Here, in this particular example, an application program may establish a connection, such as shown at line 1. With regard to line 2 above, once the connection has been established the application program may direct the connection to establish a session with a server, such as server 106, for example. With regard to line 3 above, the application program may initiate an additional session with the server, such as a netstream for streaming audio, video, and/or other content from the server. With regard to line 4, the application program may initiate a separate session with a peer device, such as peer device 104. In this example, the application may initiate the peer session simply by providing a name of the peer to an API, such as API 150. The API may then initiate a process, such as through the session established at line 2, for example, so that the server may provide the necessary information to the API to establish the session with the peer device. In this way the application program does not need to know the details for communicating with the peer, nor does the application program need to manage the peer session as a separate logical connection. From the application program's point of view, the peer session is merely a portion of the connection that was established with the server. The API allows the application program to initiate the peer session to transparently bypass a server by merely specifying an identifier (here, "nameOfPeer") associated with the peer device. In this example, an application program may stream content, such as video or audio content, real time financial content, internet radio, and/or other content from more than one source, such as a server and a peer device, while only needing to manage a single logical connection, at least in part because the API, allows the application program to treat additional sessions as if they were a portion of an already established connection.

In a particular implementation, the API as illustrated above may enable an application program to communicate through multiple sessions. Such multiple sessions may be created for communication with an application program through a single connection using any one of several protocols and/or techniques such as, for example, establishing multiple sessions using TCP/IP and/or SIP, just to name a few examples.

In one particular implementation, again not limiting claimed subject matter, multiple sessions for communication between an application program and two or more devices may be facilitated with the use of "endpoint discriminators" associated with the two or more other devices. Here, such an "endpoint discriminator" may relate to information that identifies a particular endpoint among one or more endpoints associated with a transport layer connection and/or transport layer session. Such an endpoint discriminator may comprise, for example, a Uniform Resource Identifier (URI) such as a Uniform Resource Locator (URL), Uniform Resource Name (URN), domain name and/or the like comprising information identifying a particular resource and/or entity. Such information may comprise a string of characters, for example. Additionally, although not necessarily, such an endpoint discriminator may be independent of any particular network address, for example. In other alternative embodiments, an endpoint discriminator may be derived as a function of information identifying a particular resource and/or entity.

Figure 2A:
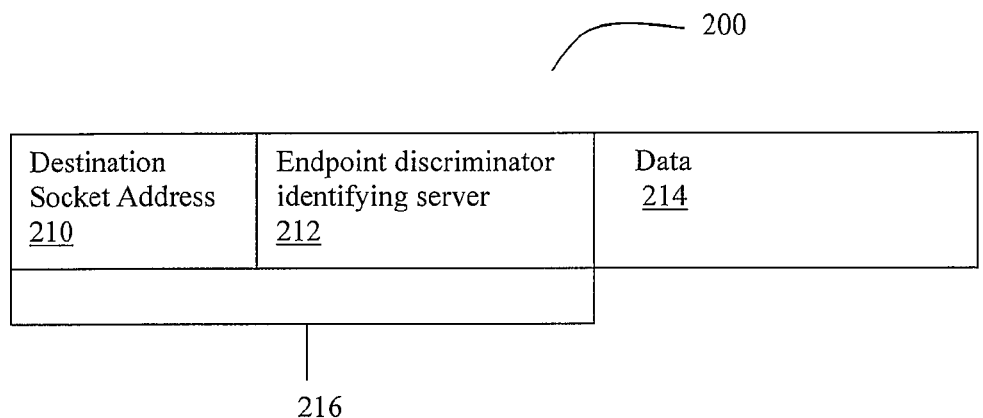
FIG. 2A is an example implementation of a data packet comprising an endpoint discriminator for identifying a server in accordance with an embodiment.

FIG. 2A shows a data packet 200 formatted according to a protocol such as, for example, an Internet Protocol for transmission from a source to a destination. In a particular example, such a data packet 200 may comprise a destination socket address 210 and an endpoint discriminator 212. In a particular embodiment, endpoint discriminator 212 may comprise information that identifies a particular desired endpoint, such as server 106, for example. In a particular example, data packet 200 may comprise a header 216 including, for example, a source socket address identifying a source, such as client device 102, attempting to initiate a session with a destination, such as server 106, for example. While FIG. 2A shows that endpoint discriminator 212 is included in a header portion of data packet 200, in another example such an endpoint discriminator may be assigned to a separate field in a data packet.

Figure 2B:
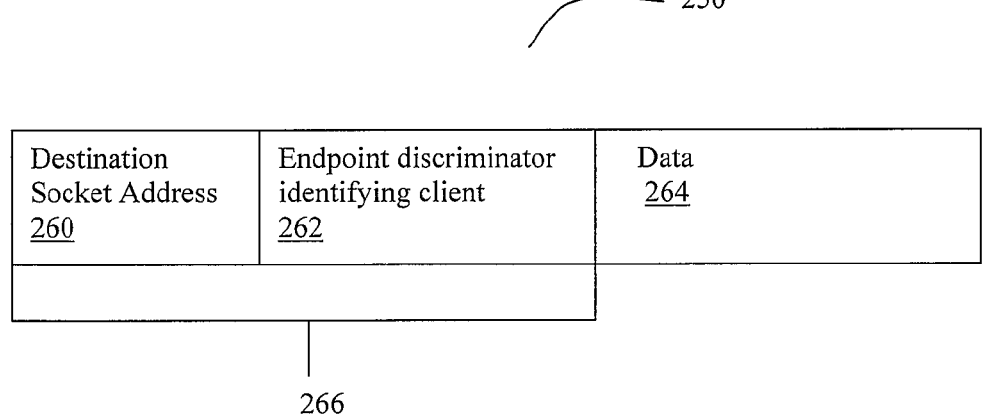
FIG. 2B is an example implementation of a data packet comprising an endpoint discriminator for identifying a peer device in accordance with an embodiment.

FIG. 2B shows a data packet 250 formatted according to a protocol such as, for example, an Internet Protocol for transmission from a source to a destination. In this embodiment, a client, such as client device 102, may format data packet 250 such that an endpoint discriminator 262 may now identify a peer device for peer-to-peer communication. In this embodiment, the client device may transmit the packet to a connection managing an established session with a server, such as by using an API as illustrated above, for example. In response the connection may establish a session with the peer device identified by endpoint discriminator 262 and/or socket address 260. Alternatively, a server may respond to data packet 250 by supplying the connection with additional information about the peer device identified by endpoint discriminator 262, such as, for example, a URL, URI, URN, domain name and/or the like. In this embodiment, the server may also send one or more messages to the peer device identified by endpoint discriminator 262, such as one or more messages alerting the peer device to expect a communication from another peer.

FIG. 3 is a flow diagram of a process 300 associated with actions of a client initiating a session with a server according to an embodiment. Again, as illustrated above, such a session may comprise one session among multiple sessions communicating with an application program through a single connection. FIG. 4 is a flow diagram of a process 400 associated with actions of a server for responding to messages from a client attempting to initiate a session and/or convert a portion of a client/server connection to a peer-to-peer session. In this context convert may mean to allow the client device to establish a session between the client device and a peer device, while using an already established connection to manage the peer session. For example, to a particular application program interacting with an API it may appear that there is only one connection and that one or more portions, such as one or more data streams, of that connection have been converted for use in peer to peer communications. In one particular embodiment, a client and server may employ messages defined in the Secure Media Flow Protocol, Version 1.2, Dec. 14, 2005 (hereinafter "Media Flow Protocol" or "MFP"). As illustrated below, a client may employ MFP to establish a session with a server selected from two or more servers through an exchange of messages in datagrams transmitted through a network according to a User Datagram Protocol (UDP) (e.g., over Internet Protocol (IP) packets). While particular examples provided herein establish a session between a client and a server using the MFP, it should be understood that such implementations are merely examples of establishing a session between a client and a server provided for the purpose of illustration.

At block 310, client device 102 may establish a connection which may in turn initiate a session with a server, such as server 106, by including a destination socket address and an endpoint discriminator identifying a particular server, such as by using a data packet as shown in FIG. 2A. Here, one or more servers associated with the destination socket address may initiate the session with the client. In one embodiment, a server associated with the endpoint discriminator may receive the session request and send a response message to the client. In another embodiment, a server at the destination socket address in the session request may not be the desired server identified by the endpoint discriminator but may be in communication with the desired server.

At block 312, process 300 may convert, employ, and/or utilize a portion of the connection established by the client device to establish a session between the client device and a peer device. For example, to a particular application program interacting with the API it may appear that there is only one connection and that one or more portions, such as one or more data streams, of that connection have been converted for use in peer to peer communications. However, the API allows the application program to actually establish and manage a separate session for the peer communication as though the separate session were a portion of the already established connection. For example, the server may construct an endpoint discriminator based at least in part on the identity of such a peer device for allowing subsequent communication between the client device and the peer device, such as with a packet as shown with regard to FIG. 2B, so that the endpoint discriminator and/or socket address now identifies the peer device as opposed to a server destination. In one embodiment, in response to a client device identifying a peer device to the API managing the connection corresponding to the established session for direct peer communication a portion of the connection may appear to be converted for such communication. The API may, under some circumstances, allow the application program to actually establish a second session for the peer communication while allowing the application to treat that session as though it were a portion of the already established connection. Under some circumstances, the converted portion of the connection between the server and client device may bypass the server for subsequent communication between the client device one or more peer devices. As just one example, a portion of a connection corresponding to an established session between a client device and a server may appear to be converted for communication between the client device and a peer device. However, the API has allowed the application program to establish a second session for the peer communication which, to the application program on the client, appears to be a converted portion of the connection. In one embodiment, the converted portion of the established connection may bypass the server, such as by establishing a different session to the peer device which may appear to an application program hosted on the client device to be a portion of the established connection between the server and the client device. Accordingly, such an application program hosted on the client device may directly communicate with the peer device through the established connection while bypassing the server. For example, the client device may communicate with the peer device to communicate, transmit, and/or receive one or more files, messages, and/or other data, such as streaming audio and/or video content. In this context, the term "bypass" as used herein may relate to direct communication between peer computing devices without further interaction and/or intervention with a server. In the particular example above, a converted portion of a connection established between the client and server may no longer need to be directed through the server in order to allow communication between the client device and a peer device.

With regard to box 314, a client may receive information from the server, wherein the information may be associated with one or more other devices (e.g., peer devices). For example, the server may have earlier transmitted the client information relating to one or more other devices available for peer-to-peer communication. The information may comprise, for example, one or more communication parameters associated with such other devices. For example, communication parameters may include physical locations of the other devices, network addresses of the other devices, names of the other devices, and/or other information that would allow the client and/or the server to identify and/or communicate with the other devices. For example, a name of the other device may comprise an identifier of some sort associated with a peer device, such as a domain name associated with the peer device, a URL associated with the peer device, a user name associated with a software program running on the peer device or a computing platform name associated with a peer device, and/or any other unique identifier associated with a peer device. In this example, a client may then use an API, such as API 150, to convert a portion of the connection into a session with an available peer device. For example, with regard to box 316, the client may then use the converted portion of the connection to communicate with the available peer device. With regard to box 318, the client and peer device may use the converted portion of the connection to publish and/or render one or more portions of data, one or more files, and/or stream data between the peer device and an application program hosted on the client. In an alternate embodiment, the client may not yet know information relating to available peers, and may instead send a request to the server via the API and/or the established connection, wherein the request indicates that client would like to communicate directly with a peer device.

In this example, the server may then redirect the client to one or more available peer devices. The server may, in this example, communicate with the one or more available peers to let them know that the client may be contacting them to establish a session associated with the client's connection. The server may then transmit a forwarding message that may include, for example, information relating to the initial client to the peer device. The server may also send a response message containing the socket address, network address, and/or port number of the identified peer device to the client. An application hosted on the client may then use a portion of the established connection to communicate with the peer device at the identified socket address. Under some circumstances, the server may also be able to terminate the communication between the client and the peer device, such as by communicating an instruction to terminate the peer communication to the client via the established connection.

FIG. 4 is a flow diagram of a process 400 hosted on a server which is responsive to requests to establish a session with a client. For example, at block 402, a server associated with a destination socket and/or endpoint discriminator may establish a session with a client, such as client device 102, for example. In a particular embodiment, the receiving server may transmit a response message formatted according to the aforementioned MFP, for example, to the client. It should be understood that this is merely one example of how a response message may be formatted for transmission to a client according to a protocol in a particular example, other formats and/or protocols may be used, such as SIP and/or TCP/IP, to name but a few examples.

With regard to box 404, a client may employ a portion of a connection corresponding to a session established between the server and the client for peer-to-peer communication between the client and one or more peer devices, such as peer device 104, for example. In this embodiment, an API at the client, such as API 150, may convert a portion of the connection for use in the peer-to-peer communication. For example, based at least in part on receiving a request for peer communication, such as the packet shown in FIG. 2B, the API may convert a portion of the connection for use in peer-to-peer communication that bypasses further communication with the server. In this embodiment, the request may include an endpoint discriminator and/or socket address associated with a second client, such as a peer device, as shown in box 406. For example, in response to receiving a bypass request, the server may reply to the client with any information necessary for direct communication with the second client using the connection corresponding to the established session. For further example, in response to a bypass request, the server may re-direct the client to the second client, while also contacting the second client to inform it of the redirect, as shown in box 408. With regard to box 410, process 400 may allow further direct communication between the client device and the peer device without requiring further actions upon the part of the server, such as by allowing direct communication between the peer devices while bypassing further communication with the server along the converted portion of the connection.

In the preceding description, various aspects of claimed subject matter have been described. Furthermore, although one or more embodiments are described in terms of various examples, it should be noted that the above described embodiments are merely illustrative examples and that claimed subject matter is not limited to those examples. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, features that would be understood by one or ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. An article comprising: a storage device comprising machine-readable instructions which, if executed on a computing device, are adapted to provide an application programming interface comprising one or more procedures to:

obtain, at said computing device, a network address of a server;

establish a first session to said server based on the obtained network address; and establish, by said application programming interface on said computing device, a second session to a peer device based on information received by said application programming interface from said server, wherein said second session bypasses said server, and wherein said information from said server is received in response to the providing said server a name associated with said peer device; and receive information from said application programming interface, said information at least in part identifying one or more communication parameters associated with said peer device, wherein an application program executed by said computing device communicates one or more files and/or messages with said peer device via said second session through said application programming interface and considers said first session and said second session to be provided by a single connection.

2. The article of claim 1, wherein said machine-readable instructions which, if executed on a computing device, are further adapted to provide an application programming interface comprising one or more procedures to:

communicate one or more files and/or messages with said peer device via the second session.

3. The article of claim 2, wherein said machine-readable instructions which, if executed on a computing device, are further adapted to provide an application programming interface comprising one or more procedures to:

transmit and/or receive one or more files and/or data between said computing device and said peer device.

4. The article of claim 1, wherein said computing device comprises a rendering device.

5. The article of claim 1, wherein said computing device comprises a publishing device.

6. An article comprising: a storage device comprising machine-readable instructions which, if executed on a computing device, are adapted to provide an application programming interface comprising one or more procedures to:

obtain, at said computing device, a network address of a server;

establish a first session with said server, based, at least in part, on said network address;

receive information from said application programming interface, said information at least in part identifying one or more communication parameters associated with a peer device; and establish, by said application programming interface, a second session with said peer device based on information received from said server, to enable an application program executing on said computing device to communicate one or more files and/or messages with said peer device bypassing communication with said server, wherein said application program considers said first session and said second session to be provided by a single connection.

7. The article of claim 6, wherein said machine-readable instructions which, if executed on a computing device, are further adapted to provide an application programming interface comprising one or more procedures to:

communicate one or more files and/or messages with said peer device via the second session.

8. The article of claim 7, wherein said machine-readable instructions which, if executed on a computing device, are further adapted to provide an application programming interface comprising one or more procedures to:

transmit and/or receive one or more files and/or data between said computing device and said peer device.

9. The article of claim 6, wherein said computing device comprises a rendering device.

10. The article of claim 6, wherein said computing device comprises a publishing device.

11. A system comprising:
a computing device, wherein said computing device comprises an application program interface (API) for said computing device to establish a second session between said computing device and a peer device based on information received by said application programming interface from a server through a first session established with said server and at least in part in response to said computing device providing said API with an indication of said peer device, wherein said second session bypasses said server, and wherein an application program executed by said computing device communicates with said peer device through said application programming interface and considers said first session and said second session to be provided by a single connection;
wherein said computing device is further operable to receive information from said API, said information at least in part identifying one or more communication parameters associated with said peer device, and
wherein said computing device is further operable to communicate one or more files and/or messages with said peer device via said second session.

12. The system of claim 11, wherein said computing device is further operable to transmit and/or receive one or more files and/or data to and/or from said peer device.

13. The system of claim 11, wherein said first computing device comprises a rendering device.

14. The system of claim 11, wherein said first computing device comprises a publishing device.

15. A method comprising:
establishing a first session between a server and a computing device; and
establishing, by an application programming interface on said computing device, a second session between said computing device and a second computing device based on information received by said application programming interface from said server through said first session, wherein said second session bypasses said server, and wherein said establishing comprises identifying said second computing device to said server connection, and wherein an application program executed by said computing device communicates with said second computing device through said application programming interface and considers said first session and said second session to be provided by a single connection;
receiving information from said first session, said information at least in part identifying one or more communication parameters associated with said second computing device; and
communicating one or more files and/or messages with said second computing device via said second session.

16. The method of claim 15, and further comprising:
transmitting and/or receiving one or more files and/or data between said computing device and said second computing device.

17. The method of claim 15, wherein said first computing device comprises a rendering device.

18. The method of claim 15, wherein said first computing device comprises a publishing device.

19. An apparatus comprising:
a computing device, wherein said computing device is operable to establish a first session with a server based on obtaining by said computing device a network address of said server;
said computing device further operable to request information using an application programming interface from said server through said first session, said information relating to a second computing device;
said computing device further operable to communicate with said second computing device via a second session established based at least in part on one or more portions of information provided by said server to said application programming interface, wherein said second session bypasses said server; and
wherein said computing device is further operable to identify said second computing device to said server, and receive information from said first session, said information at least in part identifying one or more communication parameters associated with said second computing device, and communicate one or more files and/or messages with said second computing device via said second session;
wherein an application program executed by said computing device communicates with said second computing device through said application programming interface and considers said first session and said second session to be provided by a single connection.

20. The apparatus of claim 19, wherein said computing device is further operable to transmit one or more files between said computing device and said second computing device.

21. An article comprising: a computer readable device having instructions stored therein, said instructions, if executed, resulting in the following:
establishing a first session between a server and a computing device; and
establishing, by an application programming interface on said computing device, a second session between said computing device and a second computing device based on information received by said application programming interface from said server through said first session connection, wherein said second session bypasses said server, and wherein said establishing comprises identifying said second computing device to said server;
receiving information from said first session, said information at least in part identifying one or more communication parameters associated with said second computing device; and
communicating one or more files and/or messages with said second computing device via said second session,
wherein an application program executed by said computing device communicates with said second computing device through said application programming interface and considers said first session and said second session to be provided by a single connection.

22. The article of claim 21, wherein said instructions, if executed, further result in transmitting one or more files between said computing device and said second computing device.

* * * * *

UNITED STATES PATENT AND TRADEMARK OFFICE
CERTIFICATE OF CORRECTION

| | | |
|---|---|---|
| PATENT NO. | : 8,171,147 B1 | Page 1 of 1 |
| APPLICATION NO. | : 12/034649 | |
| DATED | : May 1, 2012 | |
| INVENTOR(S) | : Matthew Kaufman | |

It is certified that error appears in the above-identified patent and that said Letters Patent is hereby corrected as shown below:

In Claim 1, Col. 10, Line 3, delete "the" and insert -- the application programming interface --, therefor.

In Claim 15, Col. 11, Line 43, delete "server connection," and insert -- server, --, therefor.

In Claim 21, Col. 12, Line 42-43, delete "session connection," and insert -- session, --, therefor.

Signed and Sealed this
Second Day of October, 2012

David J. Kappos
*Director of the United States Patent and Trademark Office*